US012755519B2

(12) United States Patent
Behpour et al.

(10) Patent No.: US 12,755,519 B2
(45) Date of Patent: Oct. 6, 2026

(54) OUT-OF-DISTRIBUTION DETECTION WITH PROJECTION OF GRADIENTS

(71) Applicant: Robert Bosch GmbH, Stuttgart (DE)

(72) Inventors: Sima Behpour, Sunnyvale, CA (US); Thang Doan, San Francisco, CA (US); Xin Li, Sunnyvale, CA (US); Wenbin He, Sunnyvale, CA (US); Liang Gou, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 332 days.

(21) Appl. No.: 18/398,629

(22) Filed: Dec. 28, 2023

(65) Prior Publication Data

US 2025/0218163 A1 Jul. 3, 2025

(51) Int. Cl.

*G06V 10/776* (2022.01)
*G06V 10/75* (2022.01)
*G06V 10/82* (2022.01)

(52) U.S. Cl.

CPC .......... *G06V 10/776* (2022.01); *G06V 10/751* (2022.01); *G06V 10/82* (2022.01)

(58) Field of Classification Search

CPC ..... G06V 10/776; G06V 10/751; G06V 10/82
See application file for complete search history.

(56) References Cited

U.S. PATENT DOCUMENTS

2022/0318557 A1* 10/2022 Mohseni ................ G06V 10/82

OTHER PUBLICATIONS

Wilson, Samuel, et al. "Hyperdimensional feature fusion for out-of-distribution detection." Proceedings of the IEEE/CVF Winter Conference on Applications of Computer Vision. 2023. (Year: 2023).*

Ndiour, Ibrahima J., Nilesh A. Ahuja, and Omesh Tickoo. "Subspace modeling for fast out-of-distribution and anomaly detection." 2022 IEEE International Conference on Image Processing (ICIP). IEEE, 2022. (Year: 2022).*

Wu, Yingwen, et al. "Low-Dimensional Gradient Helps Out-of-Distribution Detection." arXiv preprint arXiv:2310.17163 (2023). (Year: 2023).*

Dadalto, Eduardo, et al. "A Functional Data Perspective and Baseline On Multi-Layer Out-of-Distribution Detection." arXiv preprint arXiv:2306.03522 (2023). (Year: 2023).*

(Continued)

*Primary Examiner* — Stephen R Koziol
*Assistant Examiner* — Joshua Chen
(74) *Attorney, Agent, or Firm* — Dickinson Wright PLLC

(57) ABSTRACT

Methods and system for detecting out-of-distribution data for a neural network. A training dataset includes in-distribution data, for example image data associated with one or more images. The neural network is trained on the in-distribution data, and has a plurality of layers. A subspace of in-distribution data of the training dataset is generated based on a sample of one of the layers trained with the in-distribution data. Input image data associated with a sample image is received, and the neural network is executed on the input image data to determine a gradient associated with the sample image. The gradient is projected into the subspace to derive a projection of the gradient. The image data associated with the sample image is determined to be out of distribution based on a magnitude of the projection of the gradient.

20 Claims, 10 Drawing Sheets

(56) References Cited

OTHER PUBLICATIONS

D'Agostino, Danny, Ilija Ilievski, and Christine Annette Shoemaker. "Learning Active Subspaces and Discovering Important Features with Gaussian Radial Basis Functions Neural Networks." arXiv preprint arXiv:2307.05639 (2023). (Year: 2023).*
Corinna Cortes et al., "Support-Vector Networks." Machine learning 1995, 31 Pages.
Alex Krizhevsky, "Learning multiple layers of features from tiny images." Master's thesis, 2009, 60 Pages.
Andrey Malinin et al., "Shifts: A Dataset of Real Distributional Shift Across Multiple Large-Scale Tasks." arXiv:2107.07455v3 [cs.LG] Feb. 11, 2022, 44 Pages.
Angelos Filos et al., "Can Autonomous Vehicles Identify, Recover From, and Adapt to Distribution Shifts?" Proceedings of the 37 th International Conference on Machine Learning, Online, PMLR 119, 2020, 9 Pages.
Andrija Djurisic et al., "Extremely Simple Activation Shaping for Outof-Distribution Detection." arXiv:2209.09858v2 [cs.LG] May 1, 2023, 22 Pages.
Conor Igoe et al., "How Useful are Gradients for OOD Detection Really?" arXiv:2205.10439v1 [cs.LG] May 20, 2022, 17 Pages.
Cheng Tai et al., "Convolutional Neural Networks With Lowrank Regularization." arXiv:1511.06067v3 [cs.LG] Feb. 14, 2016, 11 Pages.
C. K. Chow, "On optimum recognition error and reject tradeoff." IEEE Transactions on information theory 1970, vol. 16, No. 1, pp. 41-46.
Balaji Lakshminarayanan et al., "Simple and Scalable Predictive Uncertainty Estimation using Deep Ensembles." 31st Conference on Neural Information Processing Systems (NIPS 2017), Long Beach, CA, USA, 12 Pages.
Anh Nguyen et al., "Deep Neural Networks are Easily Fooled: High Confidence Predictions for Unrecognizable Images." arXiv:1412.1897v4 [cs.CV] Apr. 2, 2015, 20 Pages.
Dan Hendrycks et al., "A Baseline for Detecting Misclassified and Out-Of-Distribution Examples in Neural Networks." arXiv:1610.02136v3 [cs.NE] Oct. 3, 2018, 12 Pages.
Dan Hendrycks et al., "Benchmarking Neural Network Robustness To Common Corruptions and Perturbations." arXiv:1903.12261v1 [cs.LG] Mar. 28, 2019, 16 Pages.
Gao Huang et al., "Densely Connected Convolutional Networks." arXiv:1608.06993v5 [cs.CV] Jan. 28, 2018, 9 Pages.
Eric Nalisnick et al., "Do Deep Generative Models Know What They Don't Know ?*" Third workshop on Bayesian Deep Learning (NeurIPS 2018), Montréal, Canada, 9 Pages.
Edward Hu et al., "Lora: Low-Rank Adaptation of Large Language Models." arXiv:2106.09685v2 [cs.CL] Oct. 16, 2021, 26 Pages.
Jiefeng Chen et al., "ATOM: Robustifying Out-of-distribution Detection Using Outlier Mining." arXiv:2006.15207v4 [cs.LG] Jun. 30, 2021, 41 Pages.
Jianxiong Xiao et al., "SUN Database: Large-scale Scene Recognition from Abbey to Zoo." 2010 IEEE computer society conference on computer vision and pattern recognition, 8 Pages.
Jia Deng et al., "ImageNet: A Large-Scale Hierarchical Image Database." 2009 IEEE conference on computer vision and pattern recognition, 9 Pages.
Haoran Wang et al., "Can multi-label classification networks know what they don't know?" 35th Conference on Neural Information Processing Systems (NeurIPS 2021), 14 Pages.
Grant Van Horn et al., "The iNaturalist Species Classification and Detection Dataset." Proceedings of the IEEE conference on computer vision and pattern recognition 2018, pp. 8769-8778.
Rui Huang et al., "On the Importance of Gradients for Detecting Distributional Shifts in the Wild." 35th Conference on Neural Information Processing Systems (NeurIPS 2021), 13 Pages.
Kimin Lee et al., "A Simple Unified Framework for Detecting Out-of-Distribution Samples and Adversarial Attacks." 32nd Conference on Neural Information Processing Systems (NeurIPS 2018), Montréal, Canada, 11 Pages.
Rui Huang et al., "MOS: Towards Scaling Out-of-distribution Detection for Large Semantic Space." arXiv:2105.01879v1 [cs.CV] May 5, 2021, 15 Pages.
Pingmei Xu et al., "TurkerGaze: Crowdsourcing Saliency withWebcam based Eye Tracking." arXiv:1504.06755v2 [cs.CV] May 20, 2015, 9 Pages.
Mircea Cimpoi et al., "Describing Textures in the Wild." Proceedings of the IEEE Conference on Computer Vision and Pattern Recognition 2014, 8 Pages.
Mingyu Xu et al., "VRA: Variational Rectified Activation for Out-of-distribution Detection." 37th Conference on Neural Information Processing Systems (NeurIPS 2023), 19 Pages.
Mark Sandler et al., "MobileNetV2: Inverted Residuals and Linear Bottlenecks." Proceedings of the IEEE conference on computer vision and pattern recognition 2018, pp. 4510-4520.
Marc Peter Deisenroth et al., "Mathematics for Machine Learning." Cambridge University Press 2020, 417 Pages.
Kaiming He et al., "Deep Residual Learning for Image Recognition." arXiv:1512.03385v1 [cs.CV] Dec. 10, 2015, 12 Pages.
Jinsol Lee et al., "Gradients as a Measure of Uncertainty in Neural Networks." arXiv:2008.08030v2 [cs.CV] Sep. 3, 2020, 6 Pages.
Ziqian Lin et al., "MOOD: Multi-level Out-of-distribution Detection." arXiv:2104.14726v1 [cs.CV] Apr. 30, 2021, 12 Pages.
Yuval Netzer et al., "Reading Digits in Natural Images with Unsupervised Feature Learning." NIPS Workshop on Deep Learning and Unsupervised Feature Learning 2011, 9 Pages.
Zhenhua Liu et al., "Frequency-Domain Dynamic Pruning for Convolutional Neural Networks." 32nd Conference on Neural Information Processing Systems (NeurIPS 2018), Montréal, Canada, 11 Pages.
Myou Sun et al., "ReAct: Out-of-distribution Detection With Rectified Activations." 35th Conference on Neural Information Processing Systems (NeurIPS 2021), 14 Pages.
Yiyou Sun et al., "DICE: Leveraging Sparsification for Out-of-Distribution Detection Yiyou Sun." arXiv:2111.09805v2 [cs.LG] Jul. 17, 2022, 24 Pages.
Xiaosong Wang et al., "ChestX-ray8: Hospital-scale Chest X-ray Database and Benchmarks on Weakly-Supervised Classification and Localization of Common Thorax Diseases." Proceedings of the IEEE conference on computer vision and pattern recognition 2017, pp. 2097-2106.
Sina Mohseni et al., "Self-Supervised Learning for Generalizable Out-of-Distribution Detection." The Thirty-Fourth AAAI Conference on Artificial Intelligence (AAAI-20), 8 Pages.
Shiyu Liang et al., "Enhancing the Reliability of Out-Of-Distribution Image Detection in Neural Networks." arXiv:1706.02690v5 [cs.LG] Aug. 30, 2020, 15 Pages.
Weitang Liu et al., "Energy-based Out-of-distribution Detection." 34th Conference on Neural Information Processing Systems (NeurIPS 2020), Vancouver, Canada, 12 Pages.
Yaniv Ovadia et al., "Can You Trust Your Model's Uncertainty? Evaluating Predictive Uncertainty Under Dataset Shift." 33rd Conference on Neural Information Processing Systems (NeurIPS 2019), Vancouver, Canada, 12 Pages.
Huanrui Yang et al., "Learning Low-rank Deep Neural Networks via Singular Vector Orthogonality Regularization and Singular Value Sparsification." arXiv:2004.09031v1 [cs.LG] Apr. 20, 2020, 14 Pages.
Jingkang Yang et al., "Generalized Out-of-Distribution Detection: A Survey." arXiv:2110.11334v2 [cs.CV] Aug. 3, 2022, 22 Pages.
Fisher Yu et al., "Construction of a Large-scale Image Dataset using Deep Learning with Humans in the Loop." arXiv: 1506.03365v1 [cs.CV] Jun. 10, 2015, 9 Pages.
Chiyuan Zhang et al., "Understanding Deep Learning (Still) Requires Rethinking Generalization." Communications of the ACM Mar. 2021, vol. 84, No. 3, pp. 107-115.
Bolei Zhou et al., "Places: A 10 million Image Database for Scene Recognition." IEEE transactions on pattern analysis and machine intelligence 2017, 14 Pages.
Feng Zhu et al. "Learning Spatial Regularization with Image-level Supervisions for Multi-label Image Classification." Proceedings of the IEEE Conference on Computer Vision and Pattern Recognition 2017, pp. 5513-5522.

(56) References Cited

OTHER PUBLICATIONS

Yves Grandvalet et al., "Support Vector Machines with a Reject Option." In International Workshop on Support Vector Machines 2002, 8 Pages.
Helen Zhou et al., "Mortality Risk Score for Critically Ill Patients with Viral or Unspecified Pneumonia: Assisting Clinicians with COVID-19 ECMO Planning." International Conference on Artificial Intelligence in Medicine Springer, 2020, pp. 336-347.
Tanmay Agarwal et al., "Learning Urban Driving Policies using Deep Reinforcement Learning." 2021 IEEE Intelligent Transportation Systems Conference (ITSC) Indianapolis, USA. Sep. 19-21, 2021, pp. 607-614.
Sridhar Swaminathan et al., "Sparse low rank factorization for deep neural network compression." Neurocomputing 2020, vol. 398, pp. 185-196.
Ian Char et al., A model-based reinforcement learning approach for beta control. APS Division of Plasma Physics Meeting Abstracts 2021, 2 Pages.
Mark Boyer et al., "Machine learing for tokamak scenario optimization: combining accelerating physics models and empirical models." Abstract only, APS Division of Plasma Physics Meeting 2021, 1 Page.

* cited by examiner

Algorithm 1 ID Subspace Computation

1: Function Compute Subspace ($f_\theta$, $D_{ID}$, $\epsilon_{th}$)
2: //Initialization
3: $S^L \leftarrow [\ ]$
4: $B_n \leftarrow$ Sample A Mini-Batch Of Size n From ID Data ($D_{ID}$)
5: $\theta \leftarrow$ Pre-Trained Network $f$ Learning Parameters
6: // Subspace Computation
7: $R^L_{ID} \leftarrow$ Forward ($B_n$,$f(\theta)$),
8: $\hat{U}^L_{ID} \leftarrow$ SVD($\hat{R}^L_{ID}$)
9: $k \leftarrow$ Criteria($\hat{R}^L_{ID}$,$R^L_{ID}$,$\epsilon^L_{th}$) // Refer To Equation 5
10: $S^L \leftarrow \hat{U}^L_{ID}$ [0:k]
11: Return $S^L$

FIG. 3C

Algorithm 2 OOD Score Computation

1: Function OOD Detector ($f_\theta$, $D_{OOD}$, $S^L$)
2: //Initialization
3: $O \leftarrow [\ ]$
4: For $x_i \in D_{OOD}$ do
5: // Gradient computation
6: $\nabla_\theta (\mathcal{L}(\theta)) \leftarrow$ SGD (xi, fθ)
7: //Gradient Projection Computation
8: $P_{SL} (\nabla_{\theta L} \mathcal{L}(\theta^L)) \leftarrow (\nabla_{\theta L} \mathcal{L}(\theta^L)) S^L (S^L)'$
9: $O(xi) \leftarrow ||P_{SL}(\nabla_{\theta L} \mathcal{L}(\theta^L))||$
10: End For
11: Return $\mathcal{O}$

FIG. 3D

OUT-OF-DISTRIBUTION DETECTION WITH PROJECTION OF GRADIENTS

TECHNICAL FIELD

The present disclosure relates to out-of-distribution detection with projection of gradients. Embodiments of the present disclosure are directed to methods and systems of detecting out-of-distribution data for a neural model.

BACKGROUND

In-distribution data, in the context of machine learning, refers to data that comes from the same distribution as the data on which a model has been trained. In other words, it represents examples or scenarios that are similar to the ones the model has seen during its training phase. When a model is exposed to in-distribution data during testing or inference, it is expected to perform well because it has learned patterns and relationships from similar data during training.

In contrast, out-of-distribution (OOD) data refers to data points that are fundamentally different from the data that a machine learning model has been trained on. These data points do not belong to the same distribution as the training data, and the model has not been exposed to them during its training process. In other words, OOD data represents scenarios or examples that are outside the scope of what the model was designed to handle.

When a machine learning model encounters OOD data during inference or testing, it may produce unpredictable or unreliable results because it lacks the ability to generalize effectively to data that is significantly different from what it has seen during training. This can lead to errors, misclassifications, or other unexpected behaviors.

Handling OOD data is a critical challenge in machine learning, as models are often sensitive to deviations from their training distribution. Detecting OOD data is important for various applications such as anomaly detection, safety-critical systems, and ensuring that machine learning models are used in a reliable and responsible manner. There exists a need to accurately detect OOD data.

SUMMARY

In one embodiment, a computer-implemented method for detecting out-of-distribution data for a neural network is provided. The method includes the following: receiving a training dataset, wherein the training dataset includes in-distribution data including image data associated with one or more images; training a neural network on the in-distribution data, wherein the neural network has a plurality of layers; generating a subspace of in-distribution data of the training dataset based on a sample of one of the layers trained with the in-distribution data; receiving image data associated with a sample image for the neural network; executing the neural network with the image data associated with the sample image to determine a gradient associated with the sample image; projecting the gradient into the subspace to derive a projection of the gradient; and determining that the image data associated with the sample image is out of distribution (OOD) based on a magnitude of the projection of the gradient.

The above method can be in the form of instructions stored in memory that cause a processor to carry out the instructions.

DETAILED DESCRIPTION

Figure 1:
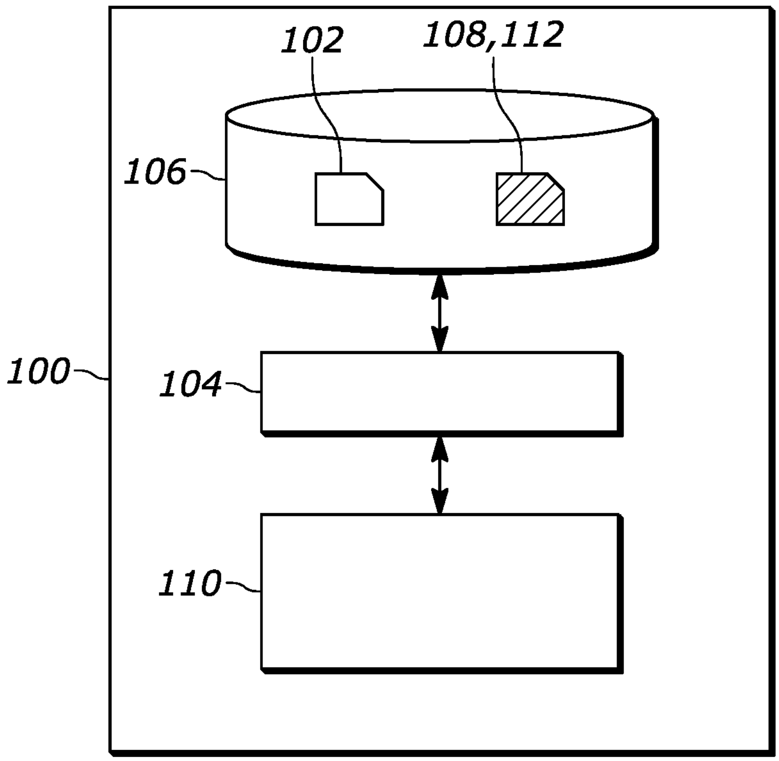
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In-distribution (ID) data, in the context of machine learning, refers to data that comes from the same distribution as the data on which a model has been trained. In other words, it represents examples or scenarios that are similar to the ones the model has seen during its training phase. When a model is exposed to in-distribution data during testing or inference, it is expected to perform well because it has learned patterns and relationships from similar data during training.

In contrast, out-of-distribution (OOD) data refers to data points that are fundamentally different from the data that a machine learning model has been trained on. These data points do not belong to the same distribution as the training data, and the model has not been exposed to them during its training process. In other words, OOD data represents scenarios or examples that are outside the scope of what the model was designed to handle.

When a machine learning model encounters OOD data during inference or testing, it may produce unpredictable or unreliable results because it lacks the ability to generalize effectively to data that is significantly different from what it has seen during training. This can lead to errors, misclassifications, or other unexpected behaviors.

The issue of identifying OOD data has become a significant focus in deep learning. Detecting OOD data may be crucial for ensuring the safe deployment of machine learning models in real-world applications. Unreliable or incorrect neural model predictions arise because modern deep neural networks (DNNs) can produce overconfident predictions on OOD inputs, complicating the separation of ID and OOD data. A main goal of OOD detection is to develop these methods that can accurately detect when a model encounters OOD data, allowing the model to either reject these inputs or provide more informative responses, such as uncertainly indication or confidence measures.

Many studies have investigated approaches to detecting OOD in deep learning. The majority of these approaches focus on calculating OOD uncertainty from the activation space of a neural network, for example, by using model output or feature representations. Another line of studies like ODIN, GradNorm, and ExGrad leverage the gradient information of deep neural network models to compute OOD uncertainty scores and achieve performant results. GradNorm investigates the richness of the gradient space and presents that gradients provide valuable information for OOD detection. In particular, GradNorm utilizes the vector norm of gradients explicitly as an OOD scoring function. GradNorm, however, considers the full gradient space information, which might be noisy and lead to sub-optimal solutions.

Other studies employ network parameter sparsification to improve OOD detection performance, like DICE and ASH. ASH removes a majority of the activation by obtaining the $p^{th}$-percentile of the entire representation. However, a potential consequence is diminished performance due to the partial removal of critical parameters within the pre-trained network. Also, this is an empirical approach without a principled way to sparsify models.

According to various embodiments disclosed herein, systems and methods are described that may be configured to facilitate OOD detection based on an observation that the important features to identify OOD data lie in the lower-rank subspace of ID data. For example, in embodiments, the systems and methods described herein may be configured to identify OOD data by computing the norm of gradient projection on the subspaces considered important for the in-distribution data. A large orthogonal projection value (e.g. a small projection value) may indicate the sample input as OOD since there may be a weak correlation to the ID data. The systems and methods described herein exhibit outstanding performance, showcasing a notable reduction in the average false positive rate when compared to the current approaches.

In embodiments, a neural network trained with in-distribution data is provided, and a subspace of the in-distribution data is generated based on a sample of one of the layers of the neural network. New input data (e.g., image) is received, and the neural network is executed on this input data to determine a gradient associated with the image. The gradient is projected into the subspace to derive a projection of the gradient. It can be determined that the input image is out of distribution (OOD) based on a magnitude of the projection of the gradient. For example, if the projection is below a threshold, the input image is determined to be OOD.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein.

Figure 2:
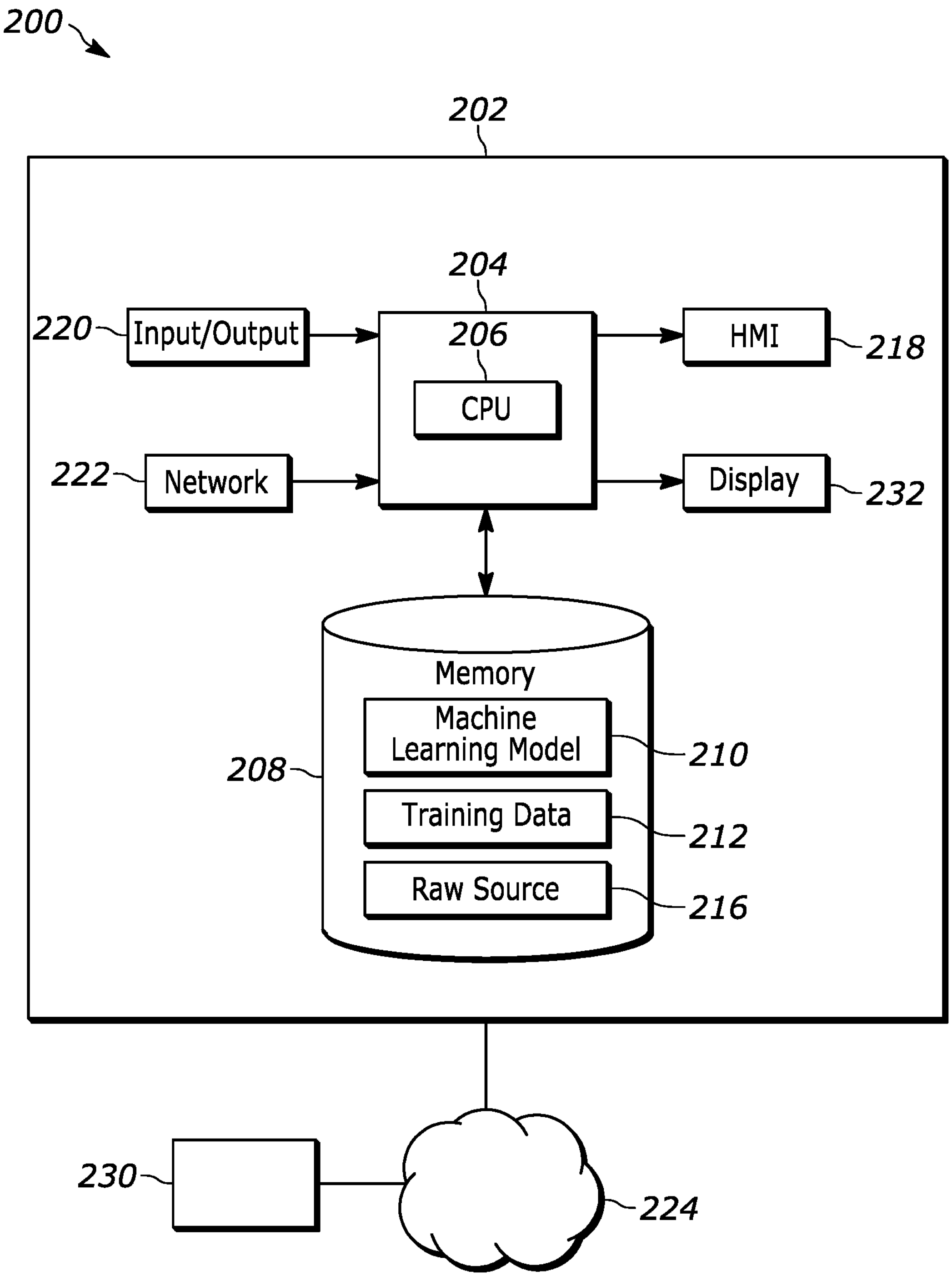
FIG. 2 shows a computer-implemented method for training and utilizing a neural network, according to an embodiment.

FIG. 2 depicts a system 200 to implement the machine-learning models and neural networks described herein. The system 200 can be implemented to train the neural network. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

Figure 3A:
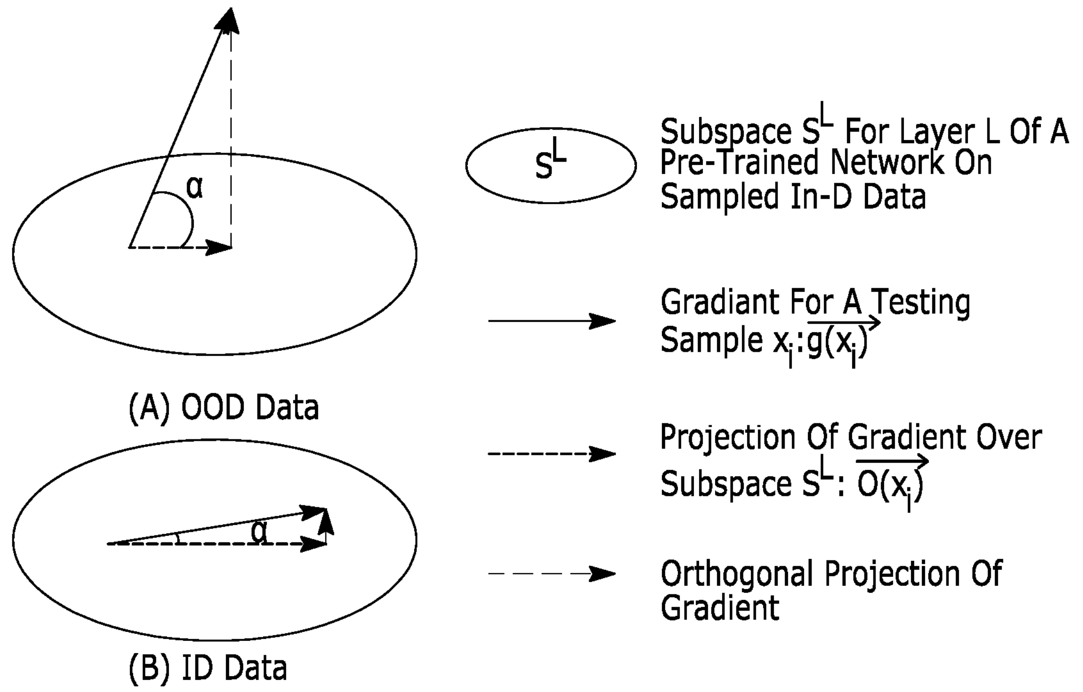
FIGS. 3A-3B illustrate schematic, visual representations of detecting out-of-distribution data for a neural network, according to an embodiment.

The methods and systems disclosed herein can distinguish OOD samples by employing orthogonal gradient projection in the low-rank subspaces of ID data. Therefore, the methods and systems disclosed herein can be referred to as GradOrth. FIG. 3A provide a visual illustration of GradOrth, namely how the methods and systems disclosed herein distinguish between ID data and OOD data. The determination is based on gradient information associated with the data fed into the neural network and, for example, singular value decomposition (SVD). First, the system uses a classifier and ID data to create a subspace $S^L$ of a sample of the network as trained with ID data. The subspace $S^L$ can be based on a sample of ID data of one layer L (e.g., the last layer) of the neural network. The data that is part of the sample of ID data can be random ID data of the one layer. In embodiments, the subspace can be derived through SVD of pre-trained network activations, on a small subset of randomly selected ID data. By leveraging SVD, the systems and methods described herein may effectively compute and identify the relevant subspaces associated with the ID data, enabling accurate discrimination of OOD samples through orthogonal gradient projection.

Once the subspace $S^L$ is created, a testing sample input data (e.g., a sample image) can pass through the neural network, and for that layer of the network which the subspace is created, the system can compute the gradient of the sample input data on that layer. As shown in FIG. 3A, the gradient is then projected onto the subspace $S^L$ of ID data.

If the projection of the gradient over the subspace $S^L$ is small (e.g., less than a threshold magnitude), this means that the similarities between the gradient and the subspace is low. Thus, it can be determined that the sample data associated with the gradient is OOD data. Similarly, if the angle $\alpha$ between the gradient of the sample data and the projection of the gradient over the subspace $S^L$ is large (e.g., greater than a threshold angle), it can be determined that the sample data associated with the gradient is OOD data. Similarly, based on geometry, the same determination that the sample data is OOD data can be based upon the magnitude of the orthogonal projection of the gradient being greater than a threshold magnitude.

Alternatively, if the sample data fed into the neural network results in a gradient projection over the subspace $S^L$ being large (e.g., greater than the threshold magnitude), this means the similarities between the gradient and the subspace is relatively high, and it can be determined that the sample data associated with the gradient is ID data. Similarly, if the angle a between the gradient of the sample data and the projection of the gradient over the subspace $S^L$ is large (e.g., less than the threshold angle), it can be determined that a sample data associated with the gradient is OOD data. Similarly, based on geometry, the same determination that the sample data is ID data can be based upon the magnitude of the orthogonal projection of the gradient being less than the threshold magnitude.

In embodiments, the magnitude of orthogonal projection can serve as a significant criterion for classifying a sample as OOD since it captures the correlation between the input and the subspace for a layer of the neural network trained on ID data.

FIG. 3A illustrates a main concept of GradOrth: measuring the orthogonal projection of the gradient of a testing sample onto a k-dimension (e.g., k=2 here) subspace of pre-trained network trained on ID data, by the angle $\alpha$ between $\overrightarrow{g(x_i)}=\nabla_{\theta^L}\mathcal{L}(\theta^L)$ and $\overrightarrow{O(x_i)}=P_{S^L}(\nabla_{\theta^L}\mathcal{L}(\theta^L))$. If $\alpha$ is large (e.g., small projection on the subspace $S^L$ as shown in (a) of FIG. 3A, then the sample data $x_i$ is weakly correlated to the ID data, and therefore it is determined to be OOD. Otherwise, the sample data is determined to be ID data, as shown in (b) of FIG. 3A.

For example, consider a neural network with L layers and a set of learning parameters $$\{\theta^l\}_l^L = 1$$

where $\theta^l$ represents the learning parameters of layer 1. Further, $$x_i^l$$

may denote the representation of input $x_i$ at layer 1 in the successive layers given the data input $x_i$. The neural network can perform the following computation at each layer:

$$x_i^{l+1} = (f(\theta^l, x_i^l)), l = 1, \ldots, L, \quad (1)$$

where, $\sigma(.)$ is a non-linear function and $f(.,.)$ is a linear function. The system may leverage matrix notation for input ($X_i$) in convolutional layers and vector notation for input ($x_i$) in fully connected layers. In the first layer, $$x_i^l$$

can refer to the raw input data. This approach holds applicability across all layers of the network. In some embodiments, the systems and methods described herein may be configured to utilize the last layer of the network which may yield the most optimal performance and may alleviate time complexity arising from gradient computations across multiple network layers.

The systems and methods described herein may be configured to capitalize on the intrinsic property of stochastic gradient descent (SGD) updates lying within the span of input data points. The description below present this relationship, specifically in fully connected layers.

For example, consider a single-layer linear neural network in a supervised learning setup where each training data pair (e.g., input/label) is derived from a training dataset, $\mathcal{D}$. The systems and methods described herein may use $x \in \mathbb{R}^n$ to present the input vector, $y \in \mathbb{R}^m$ to present the label vector in the dataset, and $\theta \in \mathbb{R}^{m \times n}$ to express the learning parameters (i.e., weights) of the network. In some embodiments, the network may be trained by minimizing a loss function (e.g., mean-squared error) as follows:

$$\mathcal{L} = \frac{1}{2}\|\theta x - y\|_2^2 \quad (2)$$

After stochastic gradient optimization, the gradient of this loss with respect to the weights can be presented as:

$$\nabla_\theta \mathcal{L} = (\theta x - y)^T = \Omega x^T \quad (3)$$

Here, $\Omega \in \mathbb{R}^m$ may denote the error vector. Consequently, the gradient update may reside within the input span (x), wherein the elements in $\Omega$ exhibit varying magnitudes, and may influence the scaling of x accordingly. For simplicity, consider per-example loss (with a batch size of 1) and mean-squared loss function. In some embodiments, the aforementioned relationship may remain applicable even in the context of the mini-batch setting or when utilizing alternative loss functions (such as cross entropy loss, where the calculation of $\Omega$ may differ). The input-gradient relationship in equation 3 may be applied to any fully connected layer of a neural network where x is the input to that layer and $\Omega$ is the error coming from the next layer. In addition, this equation also applies to the networks with non-linear units (such as ReLU) and cross-entropy losses, though $\Omega$ may be calculated differently.

The systems and methods described herein may utilize singular value decomposition (SVD) for matrix factorization. For example, a rectangular matrix $R = U\Sigma V^T \in \mathbb{R}^{m \times n}$ may be factorized using SVD into the product of three matrices. Here, $\Sigma$ may represent a matrix containing the singular values sorted along its main diagonal, while $U \in \mathbb{R}^{m \times m}$ and $V \in \mathbb{R}^{n \times n}$ may denote orthogonal matrices. In some cases, when the rank of the matrix R is $r(r \le \min(m, n))$, the matrix R can be represented as $$R = \sum_{i-1}^{r} \sigma_i u_i v_i^T,$$

where $\sigma_i \in \text{diag}(\Sigma)$ denotes the singular values and $u_i \in U$ as well as $v_i \in V$ represent the left and right singular vectors, respectively. Furthermore, the k-rank approximation to the matrix can be formulated as $$R_k = \sum_{i-1}^{k} \sigma_i u_i v_i^T,$$

where $k \le r$. The specific value of k may be determined as the smallest value that satisfies the condition $$\|(R_{ID}^L)_k\|_F^2 \ge \varepsilon_{th}\|R_{ID}^L\|_F^2, \text{ where } \|.\|_F^2$$

may represent the Frobenius norm of the matrix, and $\varepsilon_{th}$ ($0 < \varepsilon_{th} \le 1$) may serve as the threshold.

$$R_k = \sum_{i=1}^{k} \sigma_i u_i v_i^T$$

The systems and methods described herein may be configured to characterize OOD by a distribution that represents unknown scenarios encountered during deployment. These scenarios involve data samples originating from an irrelevant distribution, whose label set has no intersection with the predefined set. Consider the supervised setting where a neural network is given access to a set of training data $$\mathcal{D} = \{(xi, yi)\}_{i=1}^N$$

drawn from an unknown joint data distribution P defined on $\mathcal{X} \times y$ in the training phase. We denote the input space and output space by $\mathcal{X} \in \mathbb{R}^{n \times n}$ and y={1, 2, . . . , m}, respectively.

$$z(x) = \begin{cases} ID, & \text{if } O(x) \geq \gamma \\ OOD, & \text{if } O(x) < \gamma \end{cases} \tag{4}$$

The parameter Ω can be selected to ensure a high percentage of correct classification for in-distribution (ID) data, such as 95%. A major hurdle is to establish a scoring function O(x) that effectively captures the uncertainty associated with out-of-distribution (OOD) samples. In embodiments, the system can compute the scoring function O(x) by leveraging orthogonal gradient projection on parameter subspace of a pre-trained network over ID data. Additional details of this methodology is described below.

Figure 3B:
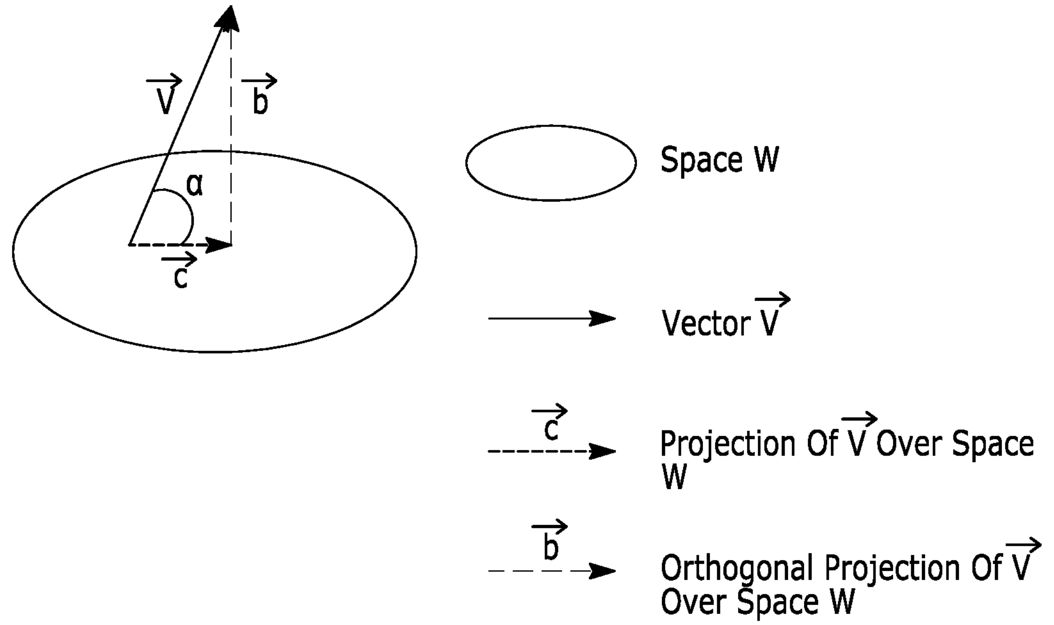

FIG. 3B illustrates the concept of orthogonal projection according to an embodiment. To simplify the explanation, it is presented it in a 2D space, but it can be extended to higher dimensions. Orthogonal projection serves as a metric that is used to calculate the distance between a vector $$\vec{v}$$

and a space $$\vec{W}$$

(represented as a matrix in this case).

The result of the orthogonal projection of vector $$\vec{v}$$

onto space $$\vec{W}$$

includes three components, namely (1) The orthogonal projection vector $$\vec{b},$$

(2) the projection vector $$\vec{c},$$

and (3) the angle α. These three components' values can be utilized to determine the correlation between the vector $$\vec{v}$$

and the space $$\vec{W}.$$

As depicted in the FIG. 3B, a larger value of $$\vec{b},$$

indicates a weaker correlation. On the other hand, $$\vec{c}$$

exhibits the opposite pattern, where a larger value of $$\vec{c}$$

indicates a stronger correlation. Depending on the specific application requirements, any of these values can be chosen to compute the correlation. In order to align with the OOD (out-of-distribution) score, where a smaller value indicates a higher degree of OODness as presented in equation 4, the projection vector $$(\vec{c})$$

is incorporated into the computations.

In embodiments, a sample as out-of-distribution (OOD) data can be defined if its orthogonal projection value is large (i.e. small projection value), indicating a weak correlation with the in-distribution (ID) data. GradOrth OOD detection is developed following steps, in embodiments.

First, GradOrth utilizes pre-trained network subspace computation. In an embodiment, an L-layer neural network with learning parameter θ is trained using in-distribution (ID) data. Upon completion of the training process, the model parameters θ are frozen, resulting in a pre-trained network specialized in ID data. It is worth mentioning that the system can also leverage the existing pre-trained network over our interest ID data. To retain the most significant parameters of the pre-trained network with respect to the ID data, GradOrth computes the network's last layer (L) subspace. For this purpose, GradOrth constructs a representation matrix denoted as $$R_{ID}^{L} = [x_1^L, x_2^L, \dots, x_n^L]$$

which concatenates n representations obtained from the network's last layer (L) through the forward pass of n randomly selected samples (e.g., a small subset, n≤N) of the ID data.

Next, GradOrth performs singular value decomposition (SVD) on $$R_{ID}^{L},$$

resulting in $$R_{ID}^L = U_{ID}^L \Sigma_{ID}^L (V_{ID}^L)^T.$$

GradOrth then proceeds to approximate its rank k by obtaining $$(R_{ID}^L)k,$$

guided by the given criteria that rely on a specified threshold, denoted as εth:

$$\|(R_{ID}^L)k\|_F^2 \geq \varepsilon th \|R_{ID}^L\|_F^2 \quad (5)$$

In one embodiment, the pre-trained network subspace, denoted as $$S^L = \text{span}\{u_1^L, u_2^L, \ldots, u_k^L\}$$

is defined as the space of significant representation for the pre-trained network at the last layer L. This subspace is spanned by the first K vectors in $$U_{ID}^L$$

and encompasses all directions associated with the highest singular values in the representation.

The subspace $S^L$ can be stored in storage and leveraged in the next step. The algorithm to compute the ID in subspace is provided in FIG. 3C as an example.

During the inference phase, the pre-trained model is exposed to an OOD sample xi. The OOD sample is propagated through the pre-trained network, and subsequently, its gradient at layer L is computed which is presented as $g(x_i)=\nabla_{\theta^L}\mathcal{L}(\theta^L)$.

The model can be then transformed into a detector by generating a score based on its output, enabling the differentiation between ID and OOD inputs. To this end, GradOrth computes the norm of sample gradient projection onto the subspace of the pre-trained network (S). For example, the system can compute the projection of the gradients $\nabla_{\theta^L}\mathcal{L}(\theta^L)$ onto the subspace $S^L$ as follows:

$$P_{S^L}(\nabla_{\theta^L}\mathcal{L}(\theta^L)) = \nabla_{\theta^L}\mathcal{L}(\theta^L))S^L(S^L)' \quad (6)$$

Here, (.)' presents the matrix transpose. Next, the system defines the OOD score for the sample as follows by computing the projection norm:

$$O(x_i) = \|P_{S^L}(\nabla_{\theta^L}\mathcal{L}(\theta^L)\| \quad (7)$$

This score serves as a surrogate to characterize the correlation between the sample and ID data that the pre-trained network trained on it. As shown in FIG. 3B, it implies a weak correlation between the new sample $x_i$ and ID when the gradient $g(x_i)=\nabla_{\theta^L}\mathcal{L}(\theta^L)$ has a small projection (large orthogonal projection) onto the subspace of the pre-trained network (large angle α) due to the fact that stochastic gradient descent (SGD) updates lie in the span of input data points [56]. FIG. 3D presents an algorithm for OOD score computation, according to an embodiment.

Using the teachings herein, GradOrth boasts a low computational complexity. It only requires computing the subspace of the pre-trained network once and can be conveniently utilized through a simple gradient calculation, without the need for hyper-parameter tuning or additional training during OOD detection. In contrast, certain methods like Mahalanobis require collecting feature representations from intermediate layers for the entire training set, which can be computationally expensive for large-scale datasets like ImageNet.

GradOrth can be used to facilitate OOD detection based on an intriguing observation that the important features to identify OOD data lie in the lower-rank subspace of in-distribution (ID) data. In particular, OOD data is identified by computing the norm of gradient projection on the subspaces considered important for the in-distribution data. A large orthogonal projection value (e.g. a small projection value) indicates the sample as OOD as it captures a weak correlation of the ID data. This simple yet effective method exhibits outstanding performance, showcasing a notable reduction in the average false positive rate at a 95% true positive rate (FPR95) of up to 8% when compared to the current state-of-the-art methods.

Figure 4:
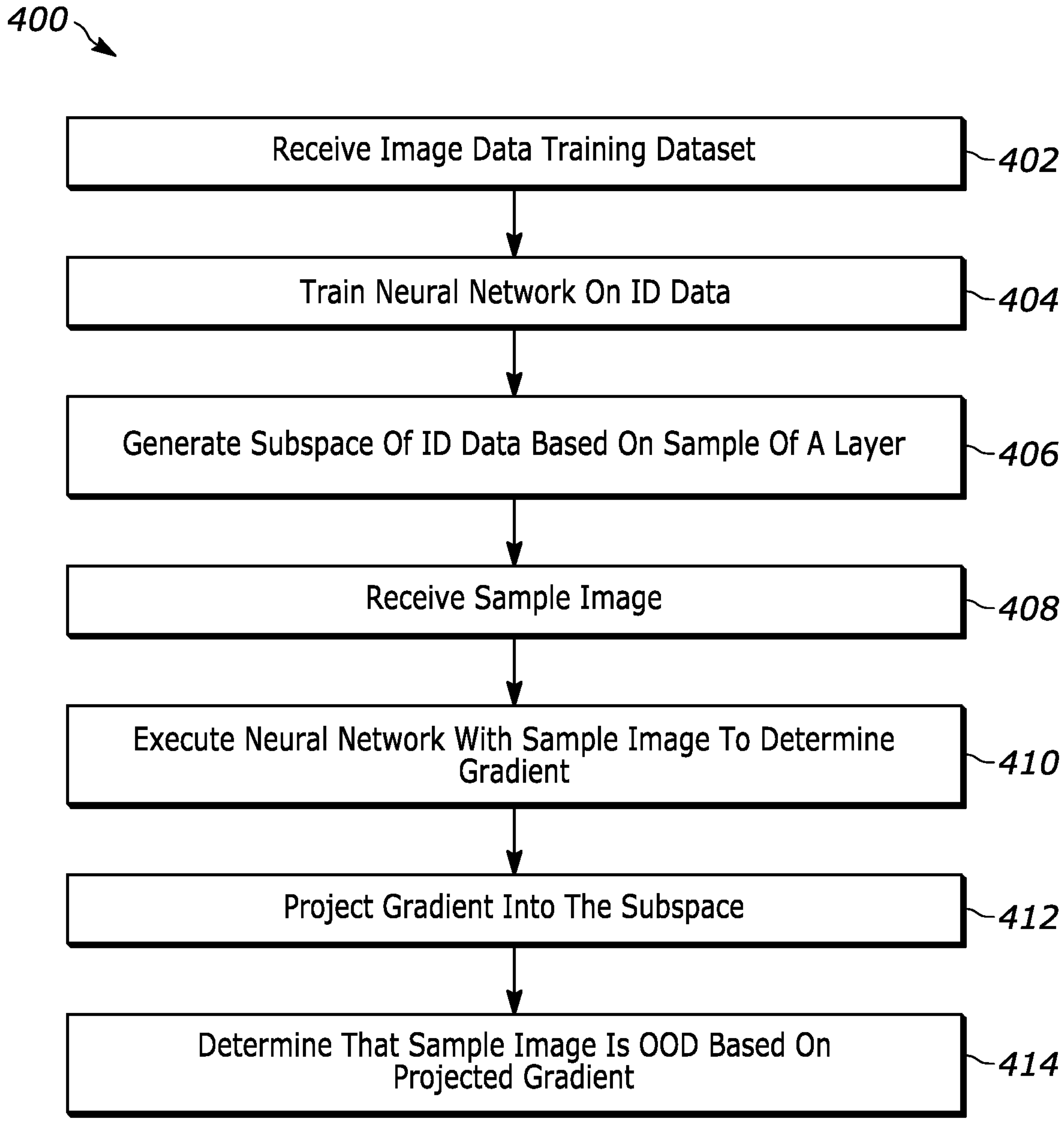
FIG. 4 is a flowchart of a method for detecting out-of-distribution data for a neural network, according to an embodiment.

FIG. 4 illustrates a method of detecting out-of-distribution data for a neural network, using the GradOrth system, for example. The method 400 can be carried out using the computer systems disclosed in FIGS. 1-2, for example. While FIG. 4 is an example of applying GradOrth to image data, this disclosure should not be limited as such. Other sensor data can be used instead of image data, and example of which are disclosed herein and in FIGS. 5-11 for example. At 402, an image data training dataset is received (e.g. by a processor), and a neural network is trained on ID data from the training data set at 404. Thus, the trained neural network can be effective when presented with ID data. At 406, a subspace ($S^L$) of ID data is generated based on a sample of a layer (L). At 408, a sample image or image data is received, and at 410 the neural network trained on the ID data is executed on the sample image to determine a gradient. At 412, the gradient is projected into the subspace. And, at 414, it is determined that the sample image is OOD based on the magnitude projected gradient.

Figure 5:
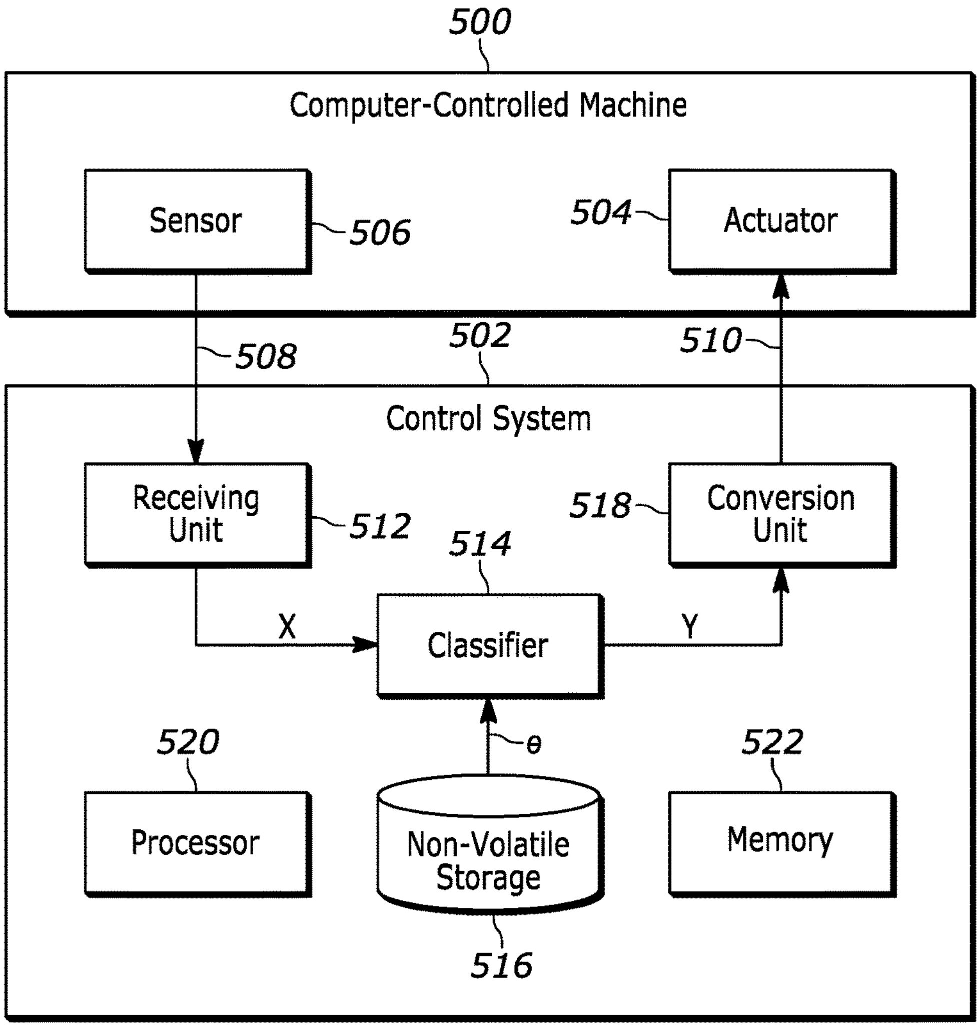
FIG. 5 depicts a schematic diagram of an interaction between a computer-controlled machine and a control system, according to an embodiment.

The methods and systems disclosed herein can be used in many different applications. Determining out-of-distribution data can be useful for a plethora of technologies, examples of which are illustrated in FIGS. 5-11. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to sense ID and/or OOD data, and the corresponding processors can be configured to determine whether the data is ID or OOD according to the teachings herein. Sensor 506 may be configured to encode the sensed condition into sensor signals 508 and to transmit sensor signals 508 to control system 502. Non-limiting examples of sensor 506 include a camera, video sensor, radar, LiDAR, ultrasonic and motion sensors, temperature sensors, and the like. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine-learning algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more machine-learning algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the machine-learning algorithms and/or methodologies as disclosed herein. Non-volatile storage 516 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
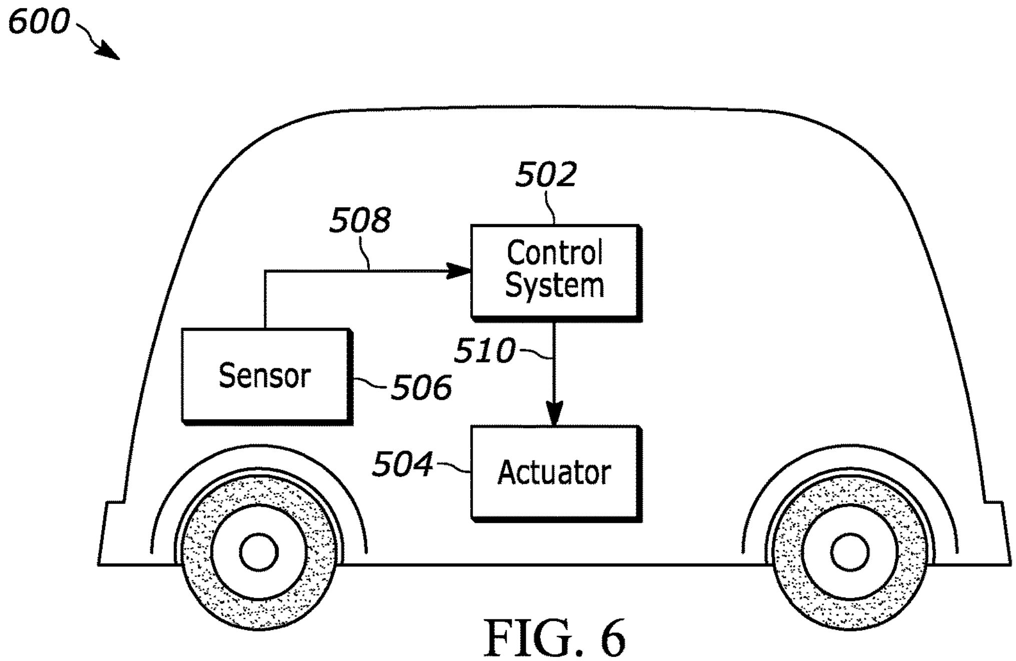
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
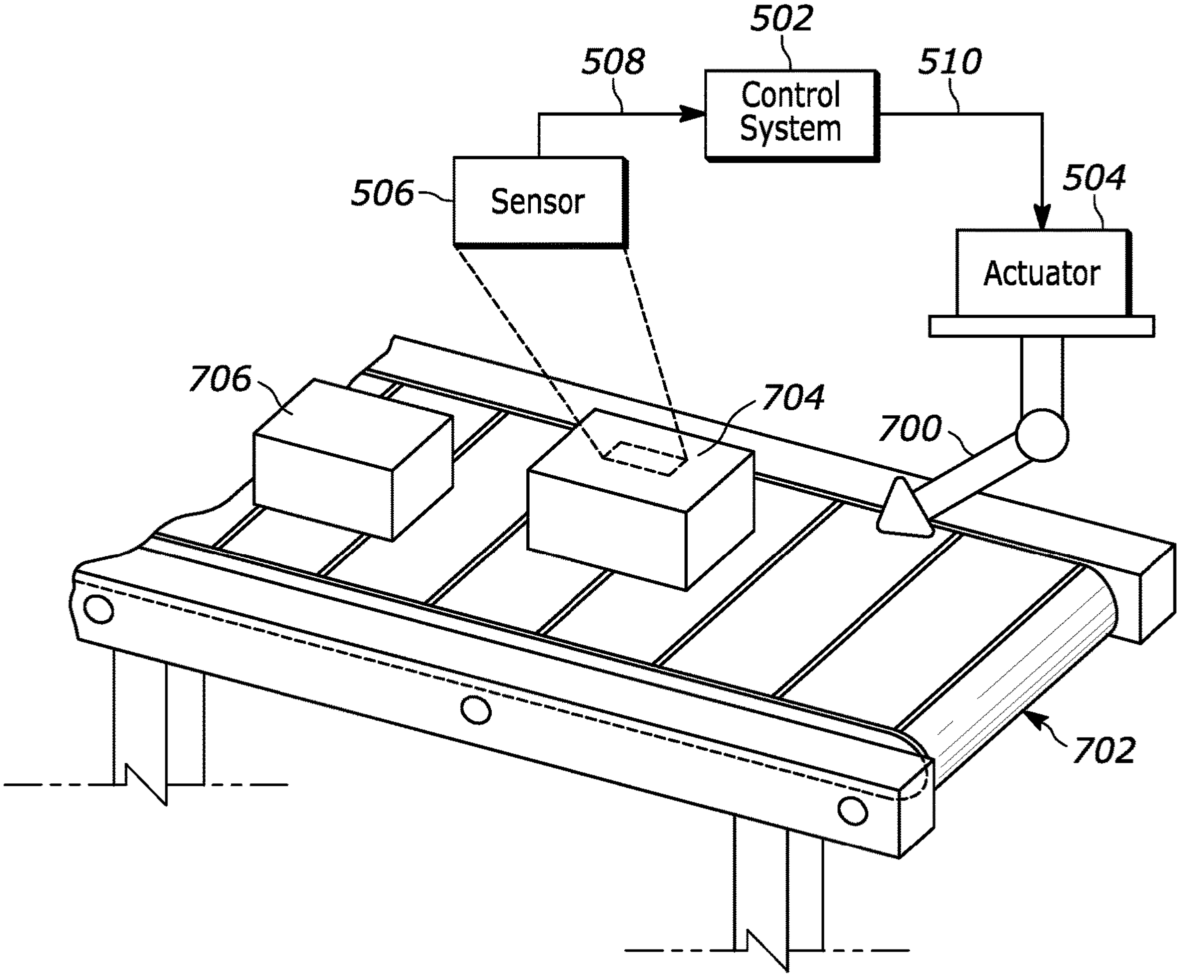
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
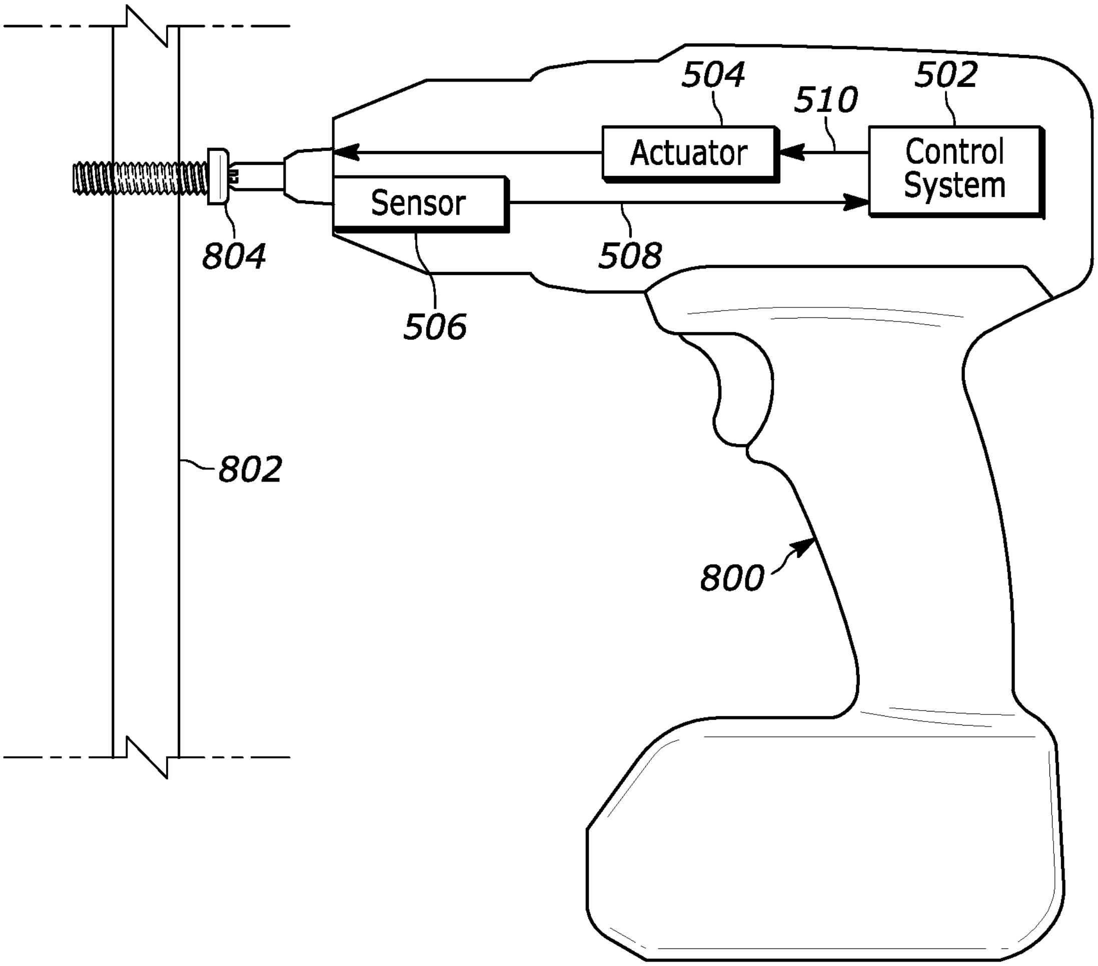
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
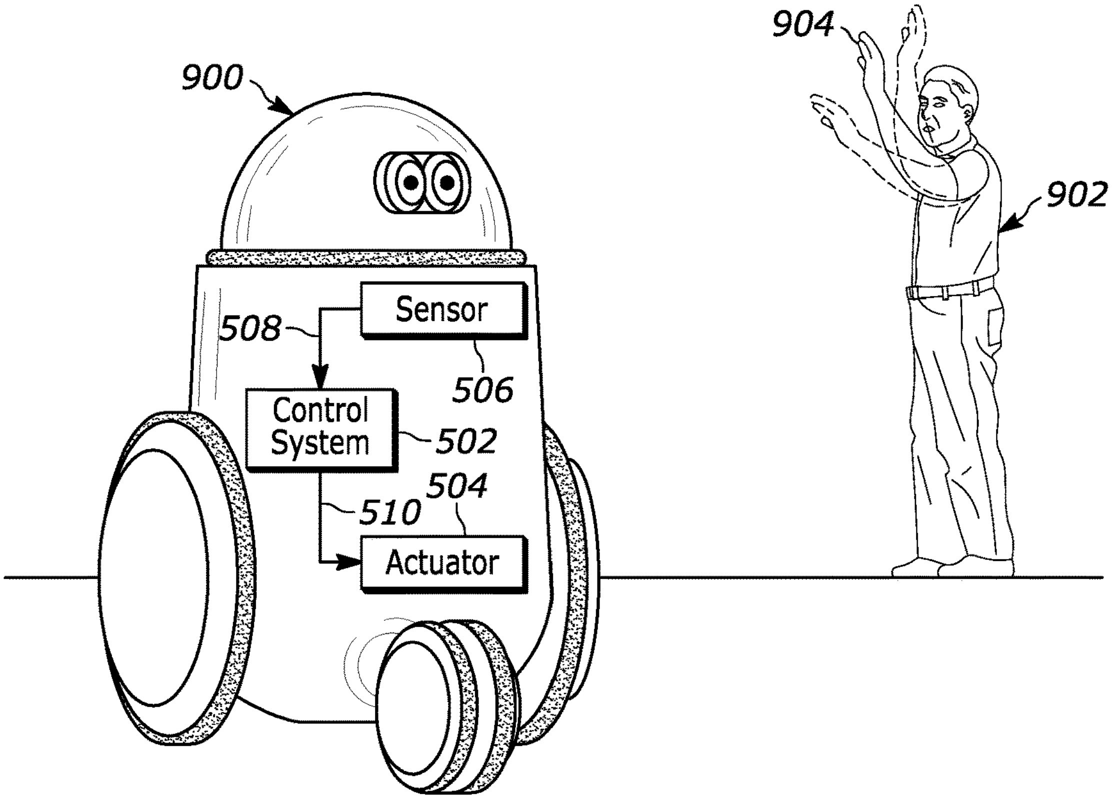
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
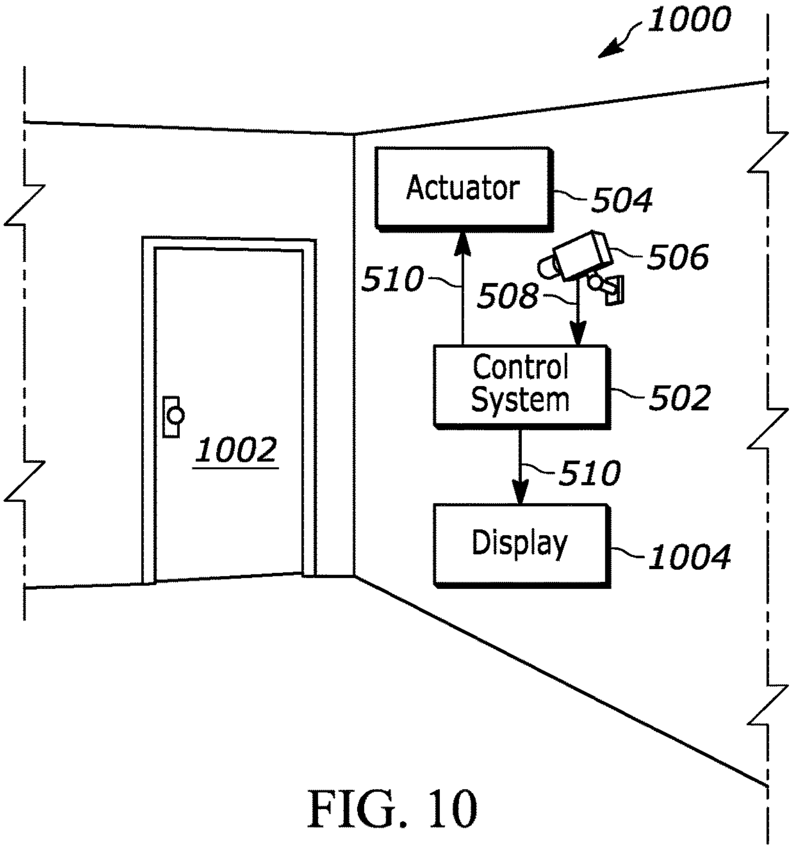
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
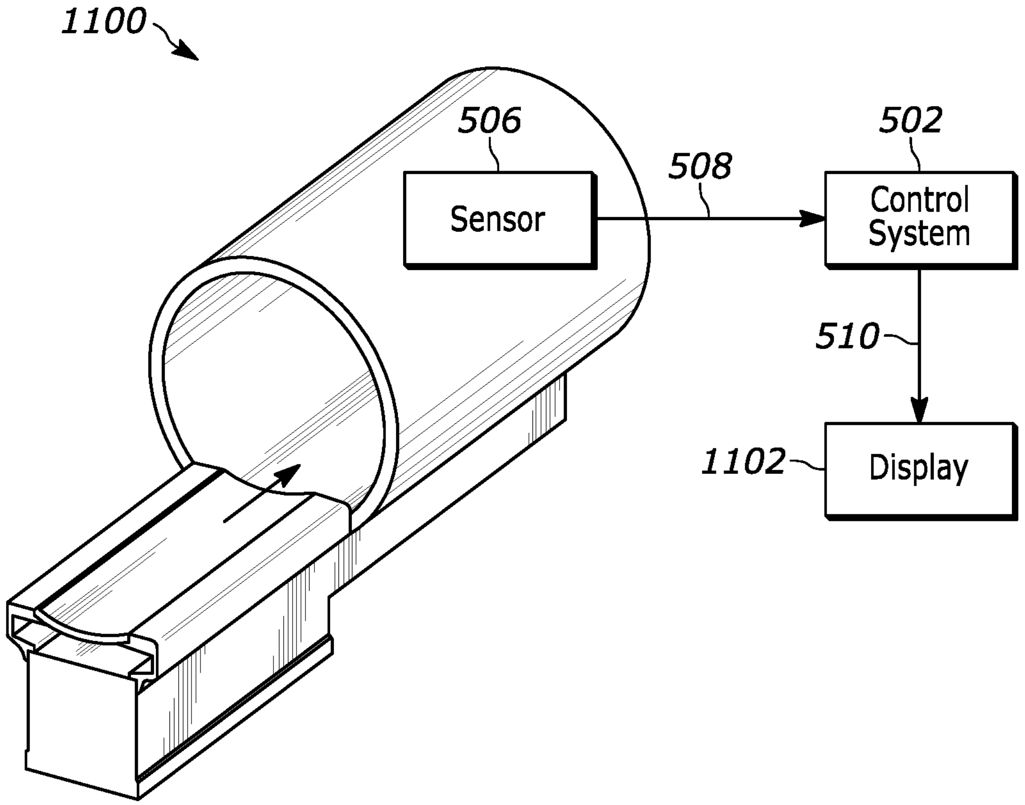
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for detecting out-of-distribution data for a neural network, the method comprising:

receiving a training dataset, wherein the training dataset includes in-distribution data including image data associated with one or more images;

training a neural network on the in-distribution data, wherein the neural network has a plurality of layers;

generating a subspace of in-distribution data of the training dataset based on representations obtained from a selected layer of the neural network trained with the in-distribution data;

receiving image data associated with a sample image for the neural network;

executing the neural network with the image data associated with the sample image to determine, for the selected layer, a gradient associated with the sample image;

projecting the gradient for the selected layer into the subspace to derive a projection of the gradient; and determining that the image data associated with the sample image is out of distribution (OOD) based on a magnitude of the projection of the gradient.

2. The method of claim 1, wherein the projection is parallel to the subspace.

3. The method of claim 2, wherein the determining the image data associated with the sample image is OOD is based on the magnitude of the projection being below a threshold.

4. The method of claim 3, wherein the determining the image data associated with the sample image is OOD is further based upon an angle between the gradient and the projection being greater than a second threshold.

5. The method of claim 1, wherein:

the executing the neural network generates a first vector associated with the sample image, the projecting of the gradient into the subspace generates a second vector, and the determining the image data associated with the sample image is OOD is based on a magnitude of the second vector.

6. The method of claim 1, wherein the subspace is generated based on the last layer of the one or more layers.

7. The method of claim 1, wherein the generating the subspace is based on singular value decomposition (SVD) and wherein the subspace is a significant representation of the layer.

8. The method of claim 1, wherein the layer is one of a linear layer and a convolution layer.

9. The method of claim 1, wherein the one or more images are at least one of: numbers, text, audio, vector image, bitmap image, and sensor signal.

10. The method of claim 1, further comprising:

determining the image data associated with a second sample image is in distribution (ID) based on a magnitude of a second projection of a second gradient being above a threshold.

11. The method of claim 1, further comprising:

receiving image data associated with a second sample image for the neural network;

executing the neural network with the image data associated with the second sample image to determine a second gradient associated with the second sample image;

projecting the second gradient into the subspace to derive a second projection of the second gradient; and determining the image data associated with the second sample image is in distribution (ID) based on a magnitude of the second projection of the second gradient being above a threshold.

12. The method of claim 1, wherein the gradient is determined based on a comparison between the image data associated with the sample image and the layer of the one or more layers.

13. A system for detecting out-of-distribution data for a neural network, the system comprising:

a processor; and memory having instructions that, when executed by the processor, cause the processor to perform the following:

receive a training dataset, wherein the training dataset includes in-distribution data including image data associated with one or more images;

train a neural network on the in-distribution data, wherein the neural network has a plurality of layers;

generate a subspace of in-distribution data of the training dataset based on representations obtained from a selected layer of the neural network trained with the in-distribution data;

receive image data associated with a sample image for the neural network;

execute the neural network with the image data associated with the sample image to determine, for the selected layer, a gradient associated with the sample image;

project the gradient for the selected layer into the subspace to derive a projection of the gradient; and determine that the image data associated with the sample image is out of distribution (OOD) based on a magnitude of the projection of the gradient.

14. The system of claim 13, wherein the projection is parallel to the subspace.

15. The system of claim 14, wherein the determination that the image data associated with the sample image is OOD is based on the magnitude of the projection being below a threshold.

16. The system of claim 15, wherein the determination that the image data associated with the sample image is OOD is further based upon an angle between the gradient and the projection being greater than a second threshold.

17. The system of claim 13, wherein:

the execution of the neural network generates a first vector associated with the sample image, the projecting of the gradient into the subspace generates a second vector, and the determination that the image data associated with the sample image is OOD is based on a magnitude of the second vector.

18. The system of claim 13, wherein the subspace is generated based on the last layer of the one or more layers.

19. The system of claim 13, wherein the generating the subspace is based on singular value decomposition (SVD).

20. A non-transitory computer-readable medium having stored thereon computer-readable instructions that, when executed by a processor, cause the processor to execute a method for detecting out-of-distribution data for a neural network, the method comprising:

receiving a training dataset, wherein the training dataset includes in-distribution data including image data associated with one or more images;

training a neural network on the in-distribution data, wherein the neural network has a plurality of layers;

generating a subspace of in-distribution data of the training dataset based on representations obtained from a selected layer of the neural network trained with the in-distribution data;

receiving image data associated with a sample image for the neural network;

executing the neural network with the image data associated with the sample image to determine, for the selected layer, a gradient associated with the sample image;

projecting the gradient for the selected layer into the subspace to derive a projection of the gradient; and determining that the image data associated with the sample image is out of distribution (OOD) based on a magnitude of the projection of the gradient.

* * * * *